Figure 3:
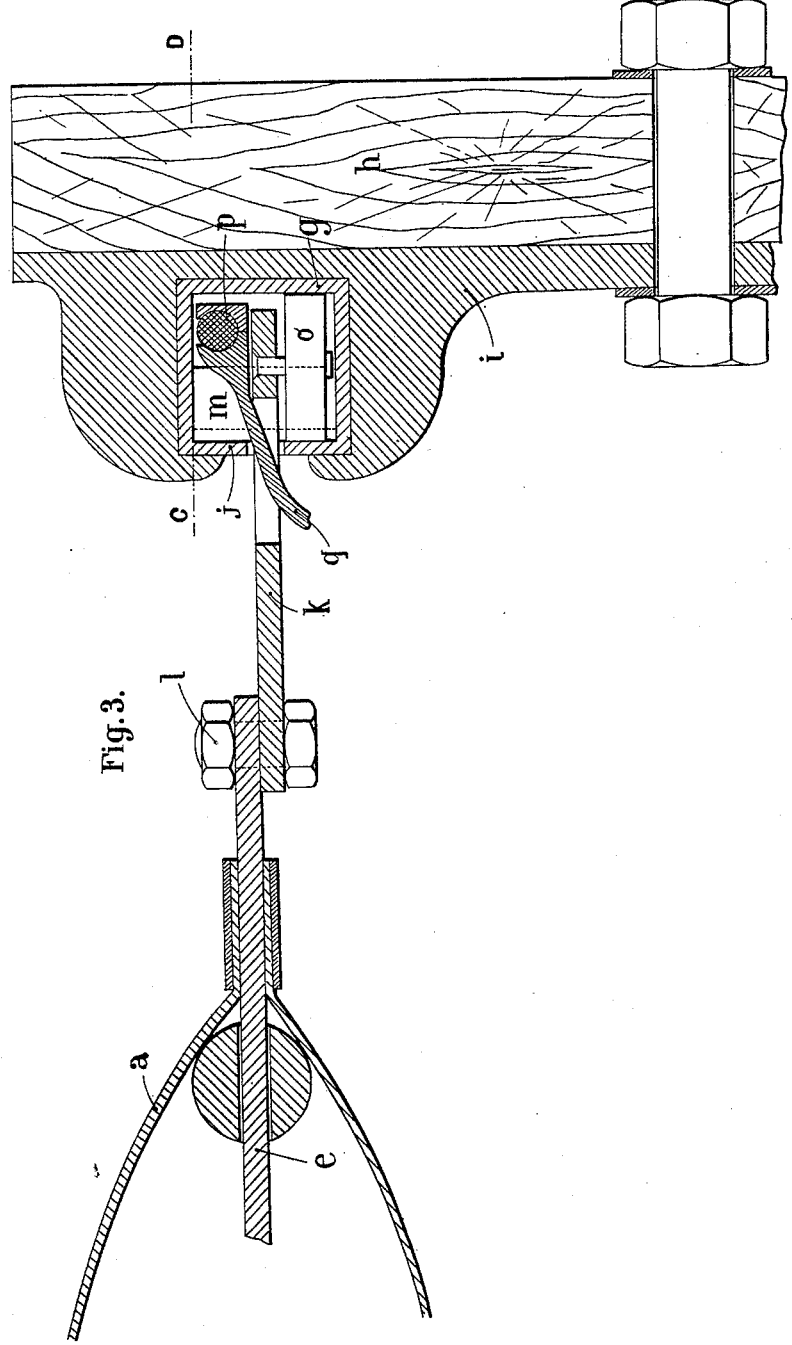

No. 630,250. Patented Aug. 1, 1899.
C. A. MARY.
APPARATUS FOR OVERHEAD TRACTION.
(Application filed Jan. 26, 1899.)
(No Model.) 3 Sheets—Sheet 1.
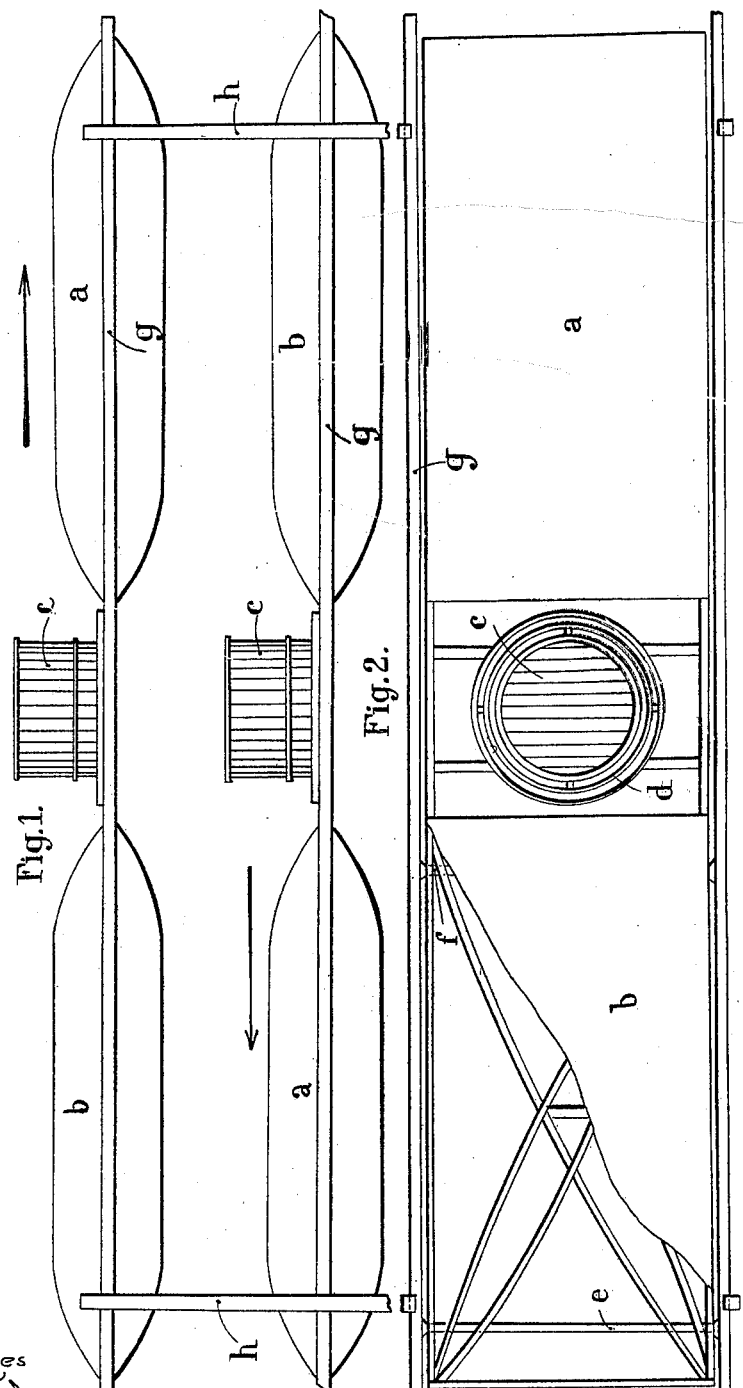

No. 630,250. Patented Aug. 1, 1899.
C. A. MARY.
APPARATUS FOR OVERHEAD TRACTION.
(Application filed Jan. 26, 1899.)
(No Model.) 3 Sheets—Sheet 2.

Witnesses Inventor
Charles A. Mary
by James L. Norris
atty

THE NORRIS PETERS CO., PHOTO-LITHO., WASHINGTON, D. C.

No. 630,250. Patented Aug. 1, 1899.
C. A. MARY.
APPARATUS FOR OVERHEAD TRACTION.
(Application filed Jan. 26, 1899.)
(No Model.) 3 Sheets—Sheet 3.
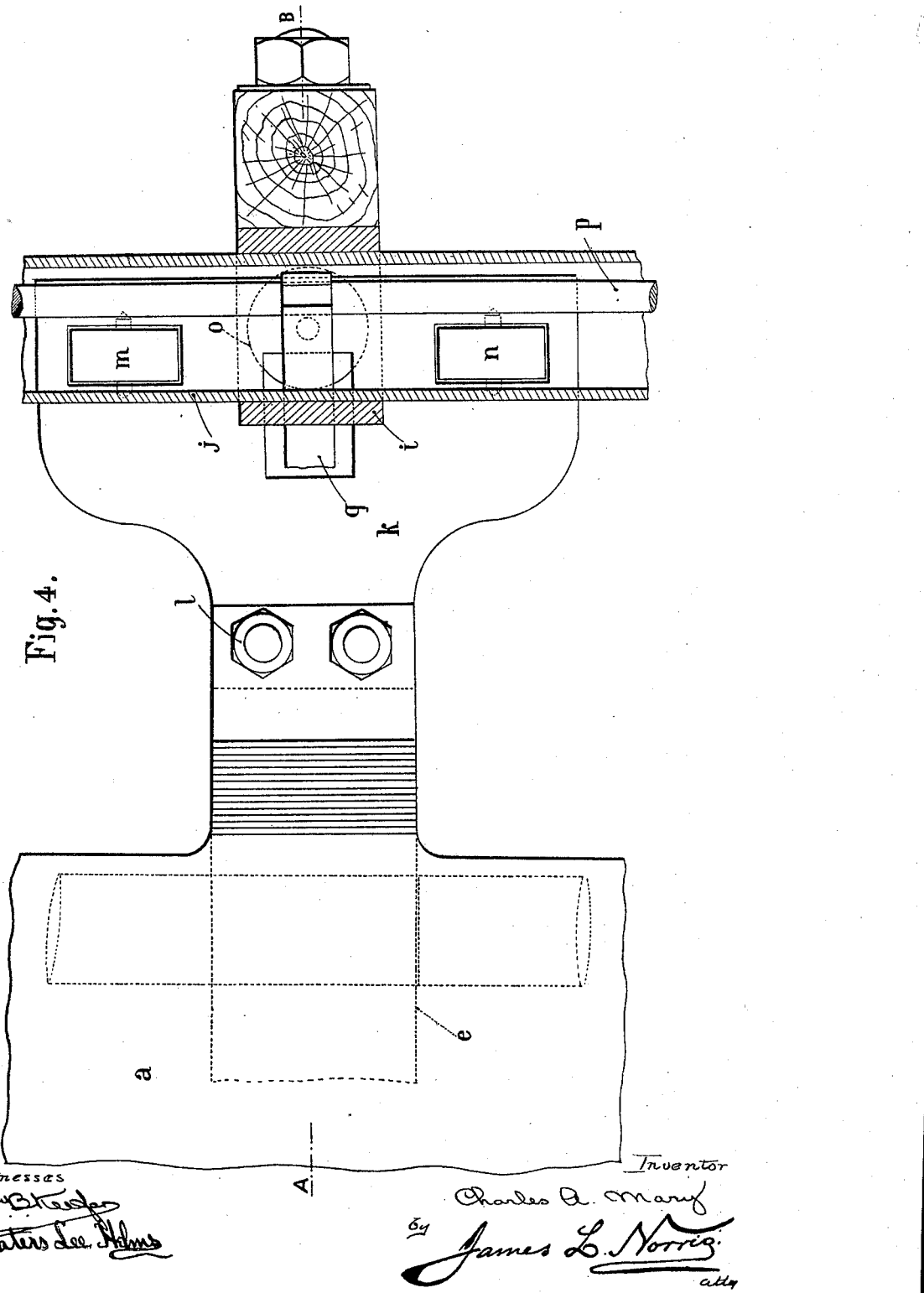

UNITED STATES PATENT OFFICE.

CHARLES ANTOINE MARY, OF PARIS, FRANCE.

APPARATUS FOR OVERHEAD TRACTION.

SPECIFICATION forming part of Letters Patent No. 630,250, dated August 1, 1899.

Application filed January 26, 1899. Serial No. 703,505. (No model.)

*To all whom it may concern:*

Be it known that I, CHARLES ANTOINE MARY, a citizen of France, residing at Paris, France, have invented certain new and useful Improvements in Apparatus for Overhead Traction, of which the following is a specification.

The object of this invention is to provide an economical apparatus for rapid and easy overhead traction, particularly available for the transport of people in great agglomerations.

The essential features of my said invention are the form and composition of vehicles which are arranged so that the up and down lines are one below the other, so as to use the same supports for each, thus decreasing very much the cost price.

The vehicles can be propelled by any suitable means. For example, the vehicles according to my invention may be provided with any suitable motor, such as an electromotor, which may be furnished either by accumulators or by a trolley. It is easily understood. Rope traction can also be used. This seems to be the best way for lines that are not too long.

The vehicles are made very light, as will hereinafter appear, and as the traction-rope will have but little strain to overcome it may consist of a simple steel wire of comparatively small diameter.

In the accompanying drawings, Figure 1 is a broken side elevation showing portion of a traction-line embodying my invention. Fig. 2 is a top plan view of the same. Fig. 3 is a detail vertical sectional view showing one of the supporting-posts, a guideway, its supporting-bracket, and a truck with which the car is connected; and Fig. 4 is a horizontal sectional view taken on the line C D, Fig. 3.

The vehicles according to this invention consist of two balloons *a b* or equivalent hollow vessels arranged tandem and of flat elongated figure. The frameworks of both balloons are rigidly connected together, so that when traveling one of them, *a*, precedes directly the other, *b*. A car *c* is connected to the framework between the balloons by gimbal-joints or otherwise in such a manner as to be kept level and steady. This car may also be arranged below the balloons by a rope-and-winch device, the rope passing over a rope-pulley fixed beneath the framework and the winch being secured to the car. These cars may contain from eight to ten travelers and the conductor.

It is desirable to approximately maintain the cars or vehicles in equilibrium, and this may be accomplished by ballast provided in the cars or vehicles and at stations. When a passenger enters a car at a station, ballast approximately equal to the weight of the person can be removed, and, conversely, when a passenger leaves a car ballast approximately the weight of the person can be restored to the car or vehicle.

Each balloon is strengthened by cross rods and stays, some of which, *e* and *f*, form the axles of the vehicle. At each end they have a truck *k*, provided with suitable runners which run in guideways *g*, constituting the railway-lines on either side of the vehicles. These guideways are supported by a series of posts *h* at each side of the traction-line, like telegraph-poles, the up and down pairs of guideways being one above the other and carried by the same posts. In one of these guideways of each line is the traction-cable *p*, driven by a motor at one of the extremities of the railway.

Figs. 3 and 4 illustrate a post and a guideway containing the traction-cable and the end of an axle. On the posts *h* are bolted or fixed in any other way the supporting-brackets *i*, having recesses containing the guideways, which preferably consist of square-section tubes *j*, in which the runners of the train travel. The said tubes *j* have longitudinal slots for the passage of the axles; but it is obvious that the section of my guideways may be different, its essential feature being its tubular form provided with slots for the passage of pieces projecting from the vehicle and maintained in the tube by any suitable means.

As stated, each axle is provided at its end with a truck *k*, which preferably consists of a flat piece secured to the axle by bolts *l*. On this truck *k* are arranged in any suitable way three or more wheels or runners to fit the tube, one or more, *m* and *n*, vertically and the other or others, *o*, horizontally. The former, *m* and *n*, have their pivots parallel to the axles of the vehicle, and their diameter is a little less than the inner height of the guideways. These runners are, so to speak, the "wheels" of the train. The horizontal runners o have for their object to avoid the pitching of the vehicle. For this purpose they bear upon the lateral faces of the guideways.

The traction-cable p is situated in the guideway at the angle left free by the runners. One of the parts projecting from the vehicle into the guideway carries a gripper q, extending outward, so as to be capable of being operated by the conductor to grip the cable or to loosen its hold on it for traction or stopping.

The passage of the vehicles from one line to the other is effected by any ordinary means, such as switches provided at the requisite places in the guideways opposite each truck k. The train will pass from one line to the other, the axles being guided by suitable means.

It is obvious that to the above-described means there may be added all other suitable ones used in that kind of railways. Also means may be provided at suitable points on the line for refilling the balloons. In tracing the track there must always be maintained a straight line, and it is easy, as the trains, according to my invention, will not meet with hindrances over which they could not pass. Indeed, the tracting strain will not be increased by climbing up an incline, because the weight of my vehicles is very little, as they are in equipoise.

What I claim is—

1. An overhead-railway vehicle consisting of two balloons or series of pairs of balloons of flat and elongated form, with their frameworks rigidly secured to each other, the cars being attached in any suitable way to the framework between two balloons in such a manner as to obtain a train occupying only a small space in height to allow the placement of the up and down lines one below the other and supported by the same posts, substantially as described.

2. In an overhead-railway system, the combination of the upper and lower sets of slotted tubes, the supporting-posts, two lines of cars having wheeled trucks traveling in the slotted tubes, one line above the other, cables running in the tubes, and cable-grips on the wheeled trucks, substantially as described.

In testimony whereof I have hereunto set my hand in presence of two subscribing witnesses.

CHARLES ANTOINE MARY.

Witnesses:
EDWARD P. MACLEAN,
ALFRED FREY.